US009336063B1

(12) United States Patent
Kempe

(10) Patent No.: US 9,336,063 B1
(45) Date of Patent: May 10, 2016

(54) DISTRIBUTED TASK MANAGEMENT

(75) Inventor: Gregory Kempe, Cape Town (ZA)

(73) Assignee: Amazon Technologies, Inc., Seattle, WA (US)

(*) Notice: Subject to any disclaimer, the term of this patent is extended or adjusted under 35 U.S.C. 154(b) by 1028 days.

(21) Appl. No.: 13/429,184

(22) Filed: Mar. 23, 2012

(51) Int. Cl.
*G06F 9/46* (2006.01)
*G06F 9/50* (2006.01)

(52) U.S. Cl.
CPC .................................. *G06F 9/5083* (2013.01)

(58) Field of Classification Search
None
See application file for complete search history.

(56) References Cited

U.S. PATENT DOCUMENTS

| 6,496,823 B2 * | 12/2002 | Blank et al. |
| 8,887,163 B2 * | 11/2014 | Rastogi ......................... 718/102 |
| 2007/0198977 A1 * | 8/2007 | Abernethy et al. ............ 718/100 |

* cited by examiner

*Primary Examiner* — Gregory A Kessler
(74) *Attorney, Agent, or Firm* — Knobbe, Martens, Olson & Bear, LLP

(57) ABSTRACT

Systems and methods are disclosed which facilitate management of a set of tasks between a plurality of task processing devices. Information corresponding to a number of tasks may be accessible to each of the task processing devices. In some instances, the information may be stored within a database. Each task processing device may claim a number of tasks, such that it is not claimable by other task processing devices, and may then process its claimed tasks. Each task processing device may be associated with a desired number of tasks, such that the desired number of tasks are claimed immediately or substantially immediately. Additional tasks may be claimed by a task processing device after a delay which may be based at least in part on the number of tasks currently claimed.

23 Claims, 4 Drawing Sheets

DISTRIBUTED TASK MANAGEMENT

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit, of the general public.

Utilization of data center resources may include configuring computing systems to assist in the processing of various types of information. For example, computing systems may be used to convert a first format of audio or video information to a second format. As a further example, computing systems may be used to process information stored within a database. In some instances, a number of computing systems may be configured to cooperatively process a shared set of tasks. For example, each task within a set of tasks may be assigned to a computing system until all tasks have been completed.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, where.

DETAILED DESCRIPTION

Figure 1:
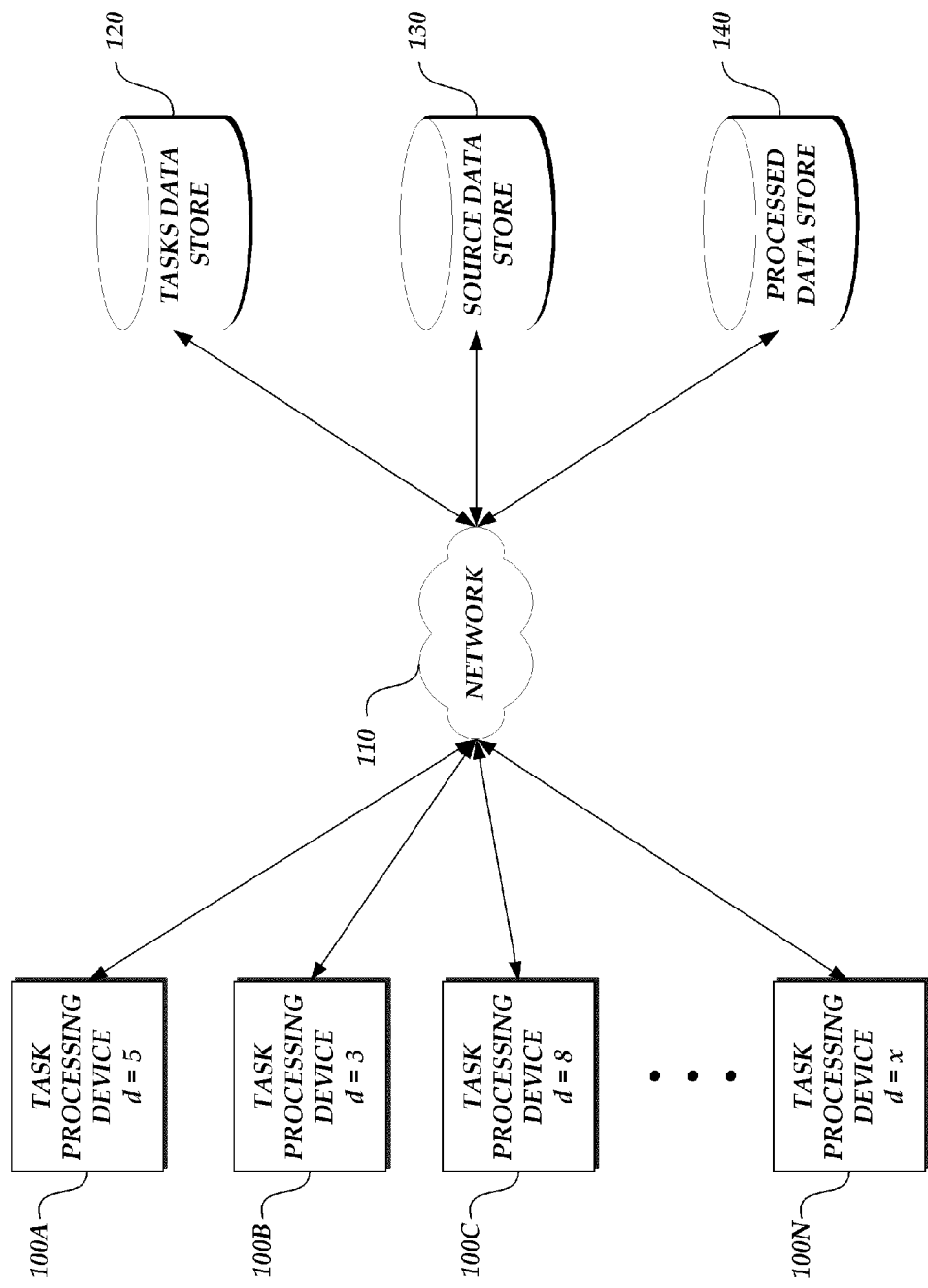
FIG. 1 is a schematic block diagram depicting an illustrative operating environment in which a number of task processing devices interact to complete a set of tasks corresponding to processing data from a source data store and storing resulting data in a processed data store.

Generally described, aspects of the present disclosure relate to managing the processing of a number of tasks between computing devices. More specifically, a data store may contain information pertaining to a number of tasks which are desired to be processed by one or more computing devices. A number of computing devices, generally referred to herein as a task processing device, may interact with the data store in order to retrieve task information and claim tasks. Generally described, a task may correspond to any set of computer readable instructions executable by a task processing device. For example, tasks may include creating, reading, updating, and deleting data. Further, tasks may include executing one or more algorithms or operations on data. Claiming a task may correspond to an indication that a specific computing device will process the task, and may serve to prevent other computing devices from claiming the task.

In accordance with embodiments of the present disclosure, a set of task processing devices may interact with the task data store in order to determine any unclaimed tasks which exist, and, if possible, to claim these tasks. Each claim to a task may be reflected in the tasks data store or an alternative data store, and may prevent other task processing devices from also claiming the task. Thereafter, each task processing device may process corresponding claimed tasks by executing computing instructions corresponding to the task, as will be described in more detail below. In some embodiments, a task processing device may process all or a subset of claimed tasks concurrently (e.g., in parallel). In other embodiments, a task processing device may process claimed tasks iteratively (e.g., in serial). Subsequent to processing a task, a task processing device may modify the tasks data store to reflect that the task has been completed. In some embodiments, as will be described below, a claim to a task may expire at a specified duration. If a task is not completed prior to this expiration, the task may, in some instances, become available for reclaiming by the same task processing device or for claiming by another task processing device. In this manner, a task may be processed by one or more task processing device until completed. By utilizing a tasks data store in conjunction with information indicating claims to each task, a number of tasks may be cooperatively processed by any number of computing devices without requiring a centralized task allocation device.

In order to facilitate cooperative processing of tasks, each task processing device may be associated with a desired number of claimed tasks. Illustratively, the desired number of claimed tasks may be based on the processing capabilities of the task processing device, the total number of tasks to be processed between all task processing devices, additional criteria, or a combination of criteria. For example, a first task processing device of relatively low processing power may desire to claim only two tasks, while a second task processing device of relatively high processing power may desire to claim twenty tasks. In some embodiments, a desired number of tasks associated with a task processing device may be based at least in part on the total number of tasks required to be processed. For example, each of a number of task processing devices may be assigned a desired number of tasks based on a percentage of the total number of tasks which should be processed. In some embodiments, percentages may be adjusted based on the processing power of a task processing device.

Each computing device may impose a delay before claiming any tasks above the desired number of tasks. For example, if the first computing device of the example above has already claimed two tasks, it may delay for n seconds before claiming a third task. Illustratively, such a delay may be imposed from the time at which the task becomes available to claim. For example, the period of delay may begin at the moment that a task is created. As a further example, the period of delay may begin at the moment that a previous claim to a task is released. In some embodiments, the delay before obtaining additional tasks may be based at least partially on the current number of claimed tasks. For example, the first computing device may delay for 2n seconds before claiming a fourth task, for 3n seconds before claiming a fourth task, etc. Such a delay may provide an opportunity for other computing devices to claim tasks, such that, if the total number of tasks is not greater than the total number of desired tasks, no computing device would be required to claim more than its desired number of tasks. As such, tasks may be distributed between multiple computing devices in accordance with each device's desired number of tasks without requiring a centralized task distribution coordination component.

In some embodiments, the delay imposed prior to claiming a task may be based at least in part on the frequency at which tasks must be performed, on the time required to process a task, and on a desired tolerance for failure. As an illustrative example, a set of 36 repeating tasks may be required to be processed by 12 task processing devices. Each task processing device may be configured to process a number of tasks concurrently. Each task may be required to be repeatedly processed at one minute intervals, and may require 50 seconds to process. Accordingly, each of the 12 task processing devices may be configured to desire to claim 3 tasks, such that under normal operating conditions, each of the 12 task processing devices need claim no more than its desired number of tasks. Illustratively, each of the 12 task processing devices may then claim 3 tasks and consecutively process the tasks. In some embodiments, after completion of each task, a task processing device may be configured to continuously reclaim its corresponding 3 tasks, such that all tasks are completed at least every 50 seconds. However, the collection of task processing devices may be configured to operate with up 25% of task processing devices failing. In such a failure scenario, 3 of the 12 task processing devices may fail, leaving 9 tasks unclaimed. As such, each of the remaining 9 task processing devices would be required to acquire an additional task. As described above, because this additional task would exceed the number of desired tasks, each task processing device may impose a delay before acquiring the additional task. However, because each task requires 50 seconds to process, and must be processed every minute, each of the remaining 9 task processing devices may delay no more than 10 seconds before acquiring the additional task. As such, the delay imposed before acquiring one task greater than the desired number of tasks may be set at 10 seconds or less. In further examples, multiple additional tasks may be required to be claimed by task processing devices during failure scenarios. As such, the total delay imposed before acquiring the multiple additional tasks may be set such that the total delay does not exceed the time available to begin processing the task.

In some embodiments, a task processing device may be configured to alter its desired number of tasks based on the number of tasks it currently claims. For example, if a task processing has claimed a large number of tasks in excess of its desired number, this may indicate that the processing of tasks is generally overloaded. As such, the task processing device may temporarily or permanently increase its desired number of tasks to compensate for such overloading. In some instances, increasing the desired number of tasks may be beneficial, since it may reduce the delay before tasks are reclaimed and processed. Conversely, if a task processing device holds less than its desired number of tasks, it may reduce its desired number of tasks.

In some embodiments, tasks claims may be associated with a claim duration. As described above, a claim may prevent other task processing devices from processing a task. As such, a claim duration may reflect the time period during which a task is claimed by a specified task processing device, and may not be claimed by other task processing devices. Illustratively, a claim duration may reflect a period during which a task processing device is processing a claimed task. For example, a first computing device may claim task A for a duration of n seconds. This duration may be recorded in the task data store, such that it is accessible to other computing devices. Each computing device may be configured such that it may extend the duration of a claim prior to the duration expiring. For example, if the first computing device has claimed no more than its desired number of tasks, the first computing device may renew its claim to task A prior to n seconds elapsing. As such, all other computing devices would be prevented from claiming task A, and the first computing device would continue to claim task A until completion of the task. However, if the first computing device has claimed more than its desired number of tasks, a delay may be imposed prior to reclaiming a task, allowing another computing device to claim the task during the delay. For example, a second computing device may currently claim less than its desired number of tasks, and as such, may desire to claim task A. When the specified duration of n seconds elapses, the second computing device may immediately or substantially immediately claim task A. The second computing device may be aware of the time at which the specified duration n will elapse based, for example, on information contained within the task data store. As such, the task A will be transferred from the first computing device (which held more than its desired number of tasks) to the second computing device (which held less than its desired number of tasks). In this manner, tasks may be evenly distributed between computing devices in accordance with each devices desired number of tasks.

As described above, a delay before acquiring tasks may be based on the number of tasks currently held. For example, the delay may increase proportionally with the number of undesired tasks currently claimed. Illustratively, a first computing device may hold ten undesired tasks (e.g., ten more than its specified number of desired tasks), while a second computing device may hold only one undesired task. As such, the delay prior to reclaiming a task implemented by the first computing device may be ten times longer than the delay implemented by the second computing device, and the second computing device would be more likely to claim a newly available task. Illustratively, the duration of a task held by the first computing device may expire, upon which the first computing device A would impose a delay of 10n before attempting to reclaim the task. Similarly, the second computing device would impose a delay of 1n before attempting to reclaim the task. As such, the task would transfer from the first computing device to the second computing device. In this manner, even where all computing devices hold more than their desired number of tasks, excess tasks may be distributed between computing devices proportionally to their desired number of claimed tasks.

In some instances, multiple computing devices may desire to acquire a task at the same time. In some embodiments, a race condition may exist in which each of these multiple computing devices may attempt to claim the task. In such a race condition, the fastest responding computing device may claim the task. In other embodiments, priorities may be associated with each computing device, such that the computing device with the highest priority may acquire the task. Further, in some instances, multiple unclaimed tasks may be simultaneously available. In some embodiments, each task may be equally likely to become acquired by a computing device. In other embodiments, tasks may be ordered, such that a computing device may attempt to claim a task with a higher ordering prior to a task with a lower ordering.

With reference to FIG. 1, an illustrative operating environment is shown which includes a number of task processing devices 100 in communication with a tasks data store 120 via a communication network 110. The illustrative operating environment of FIG. 1 further includes a source data store 130, which may store data associated with uncompleted tasks, as well as a processed data store 140 which may store data associated with processed tasks.

As illustrated in FIG. 1, the operating environment may include any n number of task processing devices 100. Each task processing device 100 may correspond to a computing device configured to process one or more tasks corresponding to information stored within the tasks data store 120. In some embodiments, task processing devices 100 may correspond to a physical computing device. In other embodiments, task processing devices 100 may correspond to virtual machine instances implemented by one or more physical computing devices. In still other embodiments, task processing devices 100 may correspond to both virtual computing devices and physical computing devices.

Each task processing device 100 may be configured to process one or more tasks. As described above, tasks may correspond to any processing of data or other information necessary or desired within the operating environment. One skilled in the art will appreciate that a task may correspond to any set of operations performed by a task processing device 100. For example, a task may correspond to reading data from a source data store 130 or to creating, modifying, or storing data in a processed data store 140. By way of non-limiting example, a task may correspond to satisfying a request from a user of an associated computing system, to converting data of a first format into data of a second format, or to transferring data from a first data store to a second data store. In some embodiments, a task processing device 100 may be configured to process one or more tasks consecutively (e.g., in parallel). In other embodiments, a task processing device 100 may be configured to process tasks iteratively.

Each task processing device 100 may be associated with a desired number of tasks d. As described above, the desired number of tasks corresponding to each task processing device 100 may be based on the processing capabilities of a task processing device 100. For example, a task processing device 100 with a relatively large amount of available processing capability may be associated with a higher number of desired tasks than a task processing device 100 with a relatively low amount of available processing power. Processing power may be determined based on a number of characteristics of a task processing device 100 including, but not limited to, speed or configuration of central processing units (CPU), graphical processing unites (GPU), random access memory (RAM), persistent storage devices (e.g., hard disk drives (HDD)), and network access (e.g., bandwidth). Further, in some embodiments, a task processing device's desired number of tasks may be based on the total number of tasks whose information is stored within the tasks data store 120. For example, each task processing device may be assigned a desired number of tasks based on a percentage of the total number of tasks in a tasks data store 120. In some embodiments, such an assigned percentage may be weighted based on the relative processing power of a task processing device 100.

As described above, in some embodiments, a task processing device 100 may be configured to alter its desired number of tasks based on the number of tasks it currently holds. For example, where a task processing device 100 holds many more than its desired number of tasks (e.g., during a time of partial system failure), it may be configured to increase its desired number of tasks. This may enable the task processing device 100 to reduce the delay before performing tasks. Conversely, if a task processing device 100 claims many fewer tasks than its desired number of tasks (e.g., in response to introduction of new task processing devices 100), the task processing device 100 may reduce its desired number of tasks. This may enable the configuration of task processing devices to deal with fluctuations in the configuration of an overall operating environment without requiring manual reconfiguration or configuration by a centralized entity.

The tasks data store 120 may contain information corresponding to some number of tasks. Further, the task data store 120 may be configured to reflect whether a task has been claimed by a task processing device 100, to prevent more than one task processing device 100 from claiming a single task, and to store the duration of a current claim to each task. Initially, all tasks within the tasks data store 120 may be unclaimed.

Each task processing device 100 may be configured to claim tasks corresponding to information within the tasks data store 120 in accordance with their desired number of tasks. As an illustrative example, each task processing may periodically check the status of all or a subset of tasks stored in the tasks data store 120. In some embodiments, a task processing device 100 may be configured to, on initialization, determine the status of each task within the tasks data store 120. For any unclaimed tasks, the task processing device 100 may attempt to claim the task in accordance with the number of currently claimed tasks. For example, tasks may be claimed iteratively, with a delay imposed prior to claiming each task. The delay may be proportional to the number of tasks in excess of the desired number of tasks. Illustratively, the delay may be zero or a fixed amount where the number of currently claimed tasks is less than the desired number of tasks. Therefore, initially, a task processing device 100A may attempt to claim a first task immediately or substantially immediately. The task processing device 100A, whose desired number of tasks is 5, as reflected in FIG. 1, may continue to attempt to claim tasks immediately or substantially immediately until the number of claimed tasks equals or exceeds the desired number of tasks.

Thereafter, the task processing device 100A may impose a delay prior to claiming a task proportional to the number of undesired tasks currently held. For example, a delay of n may be imposed before claiming a sixth task, a delay of 2n may be imposed before claiming a seventh task, etc. One example of an algorithm used to determine the delay imposed before claiming an additional task may be delay=max(claimed tasks−desired tasks+1, 0)*n, where the "max" function returns the greater of the two arguments, and where n represents a delay constant (e.g., 500 ms, 1 second, etc). Utilizing such an equation, the delay would be equal to zero until the number of claimed tasks equals the number of desired tasks. Thereafter, the delay would increase proportional to a selected n amount. The n amount may be any specified delay amount. In some embodiments, the n amount may be determined based on the tasks being processed. For example, as described above, the n amount may be chosen based on the frequency at which one or more tasks should be processed as well as the expected failure of task processing devices 100. For example, the n amount may be selected such that, if the maximum expected number of task processing devices fail, the total delay before claiming tasks does not exceed the frequency at which a task should be processed. Further, in some embodiments, a task processing device 100 may be configured to modify a tasks data store 120 to reflect that a task is claimed reluctantly (e.g., that it exceeds the task processing devices 100 desired number of tasks), as will be described in more detail below with respect to FIG. 3.

As discussed above, a claim to a task may be associated with a claim duration. In some embodiments, all claims may be of a specified claim duration. In other embodiments, a claim duration may be specified by the claiming task processing device 100. Claim durations associated with each claimed task may be reflected in the tasks data store 120, such that each task processing device 100 may be aware of current duration. Subsequent to the expiration of a claim duration, a task may automatically become unclaimed. A task processing device 100 may be configured in some instances to reclaim or extend a claim duration corresponding to a currently claimed task. For example, if a task processing device 100 has claimed less than or equal to its current desired number of tasks, the task processing device 100 may continue to reclaim each of its claimed tasks prior to expiration of each claim duration. As such, each claimed task would continue to be unavailable to other task processing devices 100. However, in instances where a task processing device 100 holds more than its desired number of tasks, it may impose a delay before reclaiming a task. As such, the task would become available for other task processing devices 100 to claim for the period of the delay. In some embodiments, the delay may be proportional to the number of tasks currently claimed that exceed the desired number of tasks, as described above.

In some embodiments, a task processing device 100 may be configured to release a task in response to a request from another task processing device 100. For example, as described above, in some embodiments tasks may be marked as claimed reluctantly in the tasks data store 120. Illustratively, a first task processing device 100A may mark a task A as claimed in excess of its desired number of claims. A second task processing device 100B may have claimed less than its desired number of tasks. As such, the second processing device 100B may request release of the task A by the first task processing device 100A. The first processing device 100A may then release the claim to the task A, such that the second task processing device 100B may claim the task. One illustrative interaction for requesting a release of a task will be described in more detail below with respect to FIG. 3.

After acquiring one or more tasks, a task processing device 100 may begin to process the claimed tasks. In some embodiments, a task processing device 100 may process all or a portion of claimed tasks in parallel. In other embodiments, a task processing device 100 may process claimed tasks iteratively. In still more embodiments, processing of tasks may be based on a priority assigned to each task. As described above, a task may correspond to any set of executable instructions processable by a task processing device 100. In some embodiments, processing a task may require acquiring source task data, performing one or more operations on the source data, and storing resulting processed task data. The operating environment as shown in FIG. 1 therefore illustratively includes a source data store 130 as well as a processed data store 140. In this illustrative example, the source data store 130 may store information corresponding to one or more tasks available for claiming in the tasks data store 120. The processed data store 140 may be configured to hold any data produced as a result of processing a task. For example, a task may correspond to converting a video file from a first format to a second format. As such, a task processing device 100 may retrieve a the video file of the first format from the source data store 130, execute instructions necessary to convert the video file, and store the resulting video file of the second format to the processed data store 140.

Figure 2:
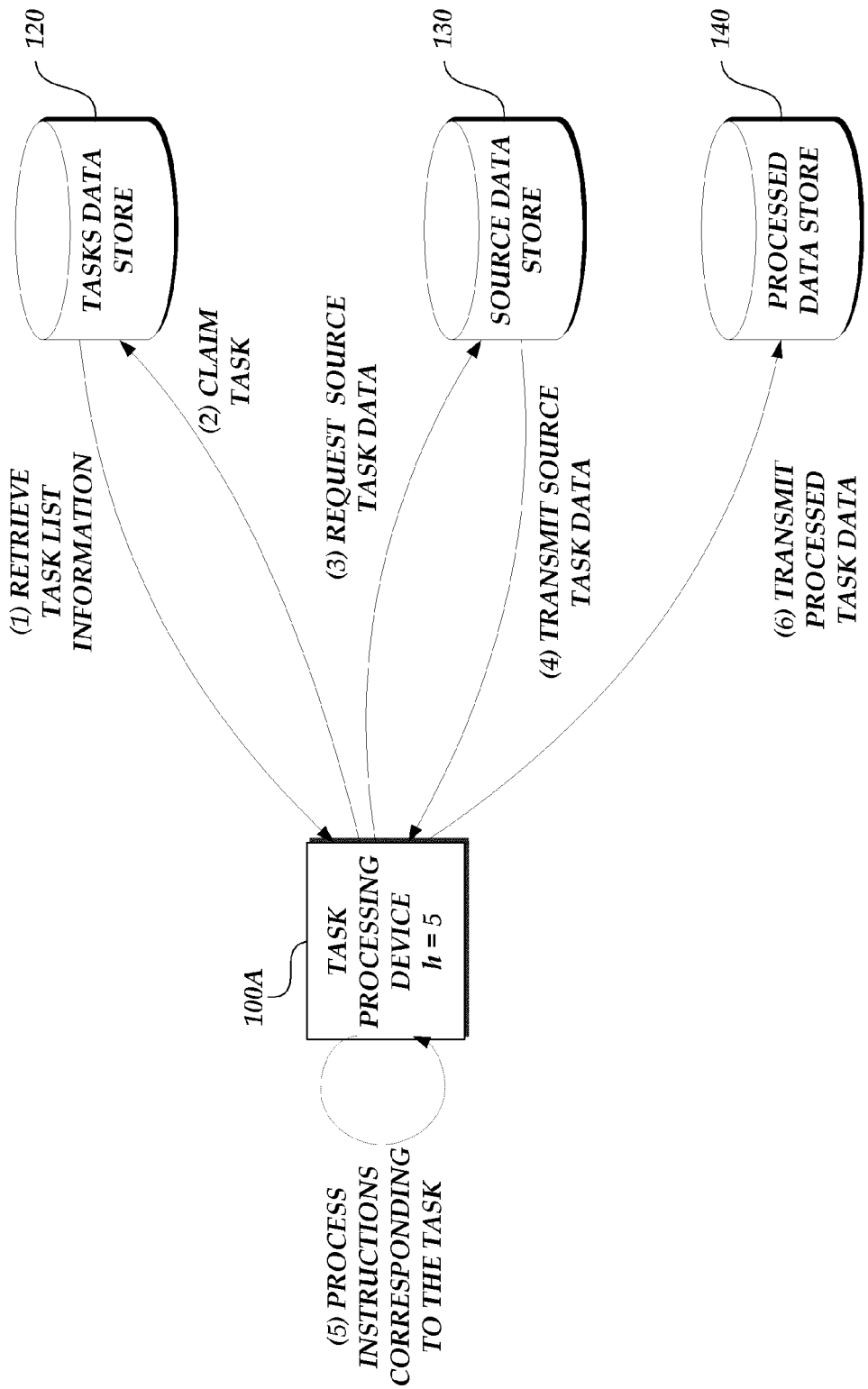
FIG. 2 is a block diagram depicting the claiming and processing of a task by a task processing device of FIG. 1.

With reference to FIG. 2, a block diagram is shown depicting the claiming of a task from a tasks data store 120 by a task processing device 100A. At (1), the task processing device 100A may retrieve task list information from the tasks data store 120. Illustratively, the task list information may correspond to a listing of all tasks, as well as their current claim status and duration of any claims. In some embodiments, a task processing device 100A may retrieve only a portion of task list information from the tasks data store 120. For example, a task processing device 100A may be configured to retrieve task status information at the expiration of a task's claim duration. Illustratively, based on previously known information, a task processing device 100A may expect the claim duration of a given task A to expire at a known point. Therefore, the task processing device 100A may query the tasks data store 120 to retrieve the status of the task A at the point at which the duration expires. The task processing device 100A may then claim the task in accordance with aspects of the present disclosure.

Specifically, if a task in the received task list information is currently unclaimed, the task processing device 100A may claim the task by transmitting a claim on the task to the tasks data store 120. As described above, claiming a task may include imposing a delay determined based on the number of currently claimed tasks. Further detail regarding delay prior to claiming a task will be described in more detail below with reference to FIG. 4. In some embodiments, where a task is claimed in excess of the number of desired tasks, the task may be marked as claimed reluctantly in the tasks data store 120. This may enable other task processing devices 100 to request release of the task by the task processing device 100A, and to claim the task themselves. In some instances, multiple task processing devices 100 may attempt to claim a task at the same time. In these instances, the tasks data store 120 may record a claim to the task to the task processing device 100 corresponding to the first received request. Further, though not displayed in FIG. 2, the tasks data store 120 may be operable to confirm a claim to a task to a task processing device 100, such that the task processing device 100 is aware of whether a claim to a task was successful.

Subsequent to claiming a task, the task processing device 100A may process the task. As described above, a task may correspond to any set of instructions executable by the task processing device 100A. In some embodiments, these instructions may be included within the tasks data store 120 and transmitted to the task processing device 100A along with the task status information. In other embodiments, task information may be stored in an additional data store (not shown in FIG. 2) and retrieved by the task processing device A as necessary. In still more embodiments, instructions corresponding to a task may be preconfigured into a task processing device A and modified in accordance with received task information. Still further, in some embodiments, a task may require receiving data from a source data store 130. Additionally, in some embodiments, a task may require storing processed data in a processed data store 140. Though shown herein, in some embodiments, processing a task may require interaction with additional or alternative components not displayed in FIG. 2. For example, processing a task may require transmission of data to or from additional or alternative computing devices.

In the illustrative interaction of FIG. 2, at (3), the task processing device 100A may request any source task data relating to the claimed task from the source data store 130. The source data store 130, at (4), may transmit the requested source task data to the task processing device 100A. Based on receiving the source task data, the task processing device 100A may, at (5), execute instructions corresponding to the task on the received source task data. As described above, these instructions may include, but are not limited to, any combination of creating data, modifying data, reading data, or deleting data, as well as performing additional or alternative algorithms or operations on data. In the illustrative embodiment of FIG. 2, processing instructions corresponding to the task may result in processed data. This processed task data may, at (6), be transmitted in the processed data store 140.

Though not shown in FIG. 2, thereafter, the task processing device 100A may further interact with the tasks data store 120 to verify that the task has been completed. For example, the tasks data store 120 may modify the task to reflect that it has been completed. In some embodiments, the tasks data store 120 may delete information corresponding to the task from the tasks data store 120.

Figure 3:
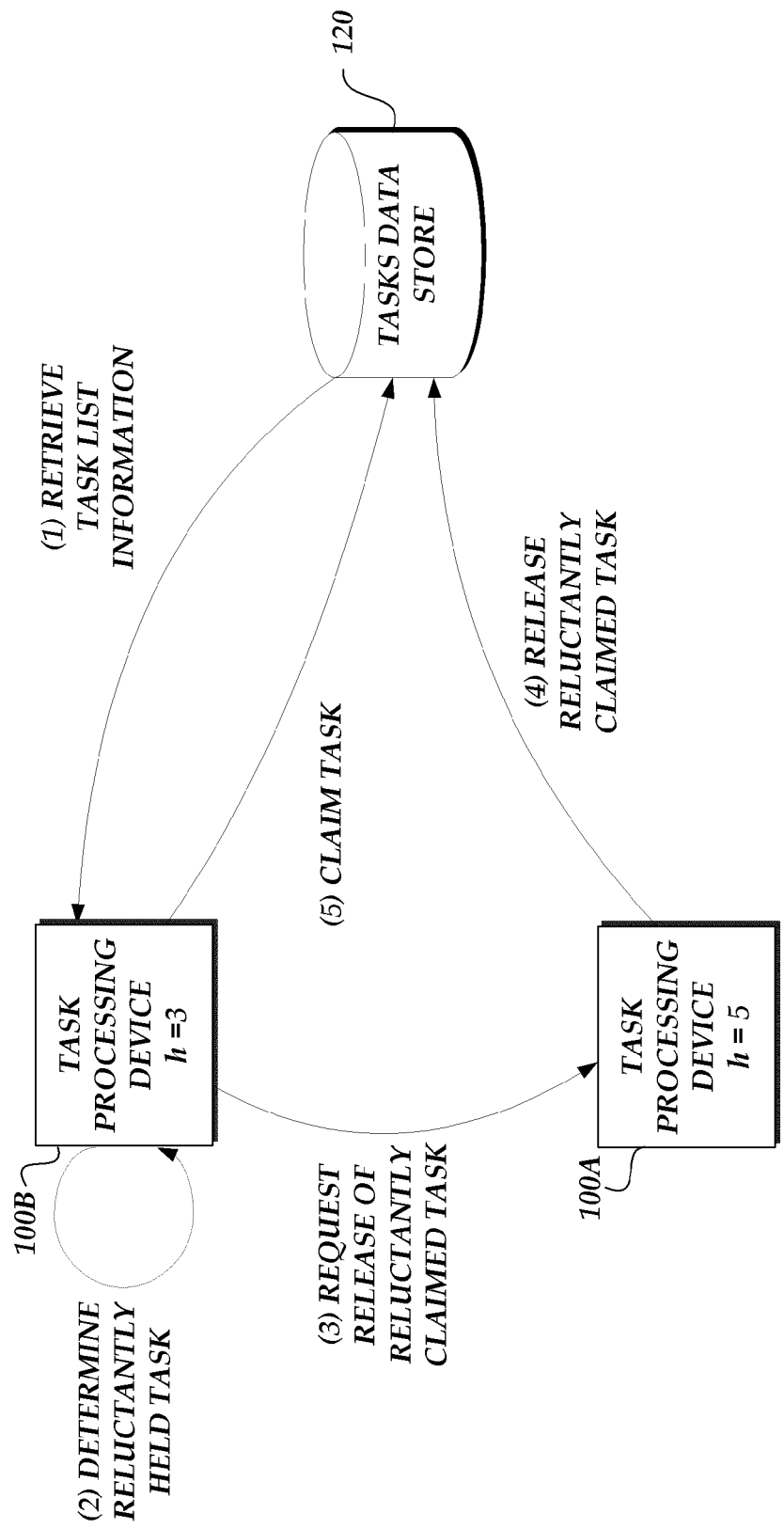
FIG. 3 is a block diagram depicting a first task processing device of FIG. 1 requesting the release of a claim to a task by a second task processing device, and claiming of the task by the first task processing device.

With reference to FIG. 3, a block diagram is shown depicting the transfer for a task from a first task processing device 100A to a second task processing device 100B based on a request to transfer the task. Illustratively, a request to transfer a task may occur when the task processing device 100B determines that the task processing device 100A has reluctantly claimed the task. Reluctantly claiming a task may occur, for example, where claiming the task causes the task processing device 100A to exceed its desired number of claimed tasks. For example, the task processing device 100A may be associated with five desired tasks, as reflected in FIG. 3. Illustratively, the task processing device 100A may hold claim to six tasks, and may therefore claim at least on of these tasks reluctantly. In some embodiments, a task processing device 100 may only mark as reluctantly claimed those tasks which exceed its number of desired tasks. In other embodiments, a task processing device 100 may mark all tasks as reluctantly claimed when the number of claimed tasks exceeds the desired number of claimed tasks. Information corresponding to reluctantly claimed tasks may be stored in the tasks data store 120, enabling other task processing devices 100 to identify reluctantly held tasks.

With continued reference to FIG. 3, at (1), the task processing device 100B may retrieve task list information from the tasks data store 120, including an indication of one or more tasks reluctantly claimed by other task processing devices, such as task processing device 100A. Illustratively, the task processing device 100A may hold six tasks, while only desiring to hold five. Further, the task processing device 100B may hold only one task, while desiring to hold three. As such, the task processing device 100B may, at (2), determine at least one reluctantly claimed task to request for release. In some embodiments, the task processing device 100B may further determine the task processing device 100 corresponding to the reluctantly claimed task. In other embodiments, information may be included in the tasks data store 120 identifying the task processing device 100 reluctantly holding a task.

In the illustrative interaction of FIG. 3, the task processing device 100B may determine that the task processing device 100A is reluctantly holding at least one task. Thereafter, at (3), the task processing device 100B may request that the task processing device 100A release its claim to the determined task. In some embodiments, a task processing device 100 may be operable to determine whether the grant such a request to release a task. Such determination may be made, for instance, based on the progress in processing the task. For example, a reluctantly claimed task may be nearing completion, and as such, the task processing device 100A may determine that the task should not be released. In some such embodiments, the task processing device 100A may transmit a rejection to the requesting task processing device 100B. In other embodiments, a task processing device 100 may be configured to automatically comply with a request to release a reluctantly held task.

Thereafter, at (4), the task processing device 100A may transmit a release of its claim to the determined task to the tasks data store 120. In some embodiments, such a release may correspond to shortening the duration of a claim to the task in question. For example, if a duration of five minutes currently exists for the claimed task, the task processing device 100A may modify the claimed duration to a few seconds. In other embodiments, such a release may correspond to relinquishing a claim to a task, making the task available to other task processing devices immediately or substantially immediately. In some embodiments, the task processing device 100A may inform the task processing device 100B of the updated duration or release.

Accordingly, at (5), the task processing device 100B may transmit a claim to the task to the tasks data store 120. The task processing device 100B may then process the task as described above with respect to FIG. 2.

Figure 4:
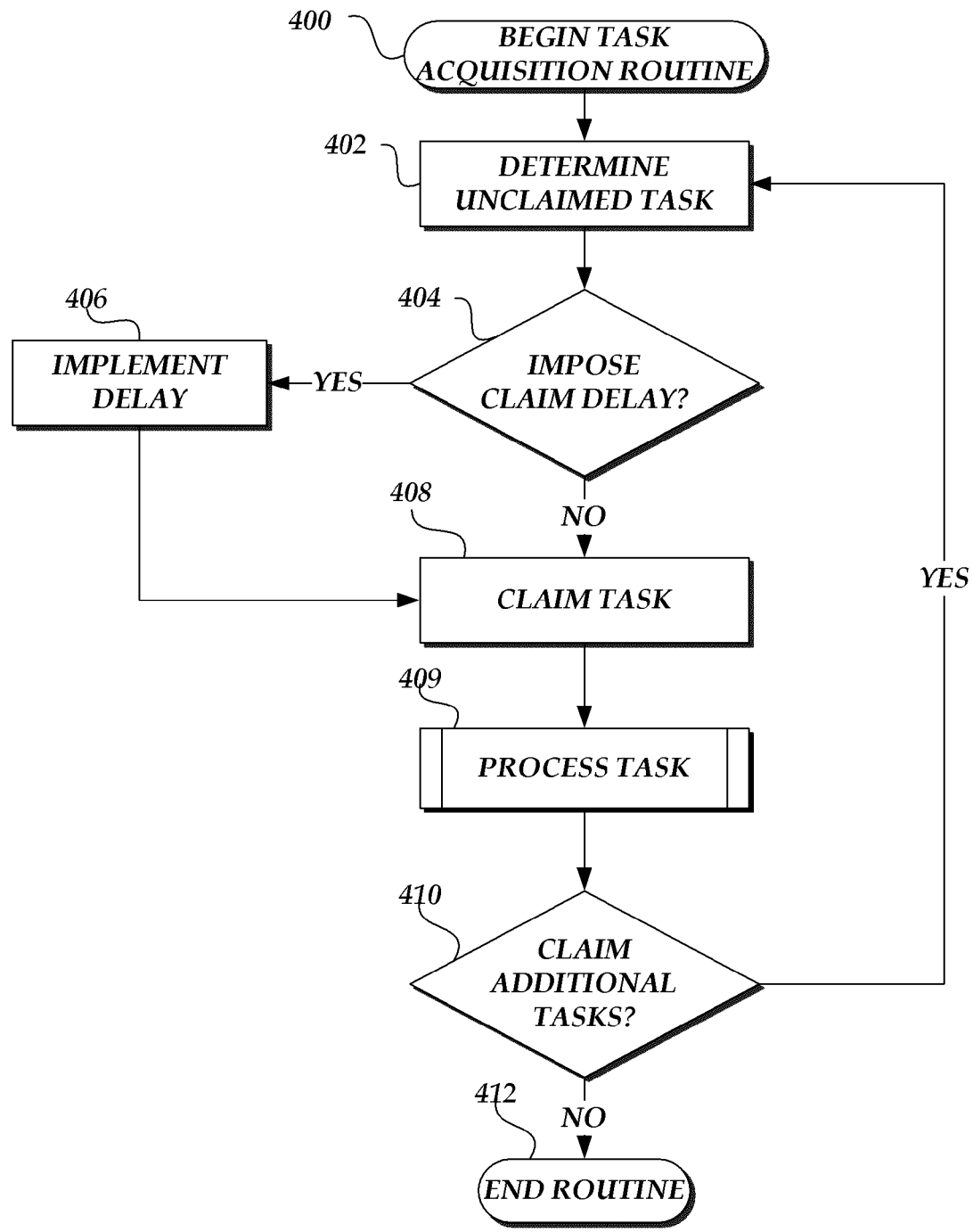
FIG. 4 is a flow diagram depicting an illustrative routine for claiming a number of tasks by a task processing device of FIG. 1.

With reference to FIG. 4, a flow diagram depicting an illustrative routine 400 for claiming a task, such as a task stored in a tasks data store 120 of FIG. 1, is shown. The routine 400 may be implemented, for example, by one or more task processing devices 100 of FIG. 1.

At block 402, a task processing device 100 may determine a task which is currently unclaimed. Such a determination may be made, for example, based on task status information received from a tasks data store 120. As a further example, determination of an unclaimed task may be based at least in part on a known claim duration corresponding to a previous claim on a task. At block 404, the task processing device 100 may determine whether to impose a delay prior to attempting to claim the determined task. As described above, a delay may be imposed in instances where the task processing device 100 already holds a desired number of tasks. If the task processing device 100 determines that no delay should be imposed, the routine 400 may continue at block 408.

Alternatively, if the task processing device 100 determines that a delay should be imposed prior to claiming a task, the routine may proceed at block 406. At block 406, a delay may be implemented prior to claiming the determined task. As described above, a delay may be implemented when a task processing device 100 claims equal to or over its desired number of tasks. Such a delay may, for example, allow other task processing devices 100 to claim the task. As described above, the duration of the delay may be based at least partially on the number of tasks claimed in excess of the desired number of claims. For example, a delay of n may be imposed before claiming a first task beyond the desired number of tasks, a delay of 2n may be imposed before claiming a second task beyond the desired number of tasks, etc. One example of an algorithm used to determine the delay imposed before claiming an additional task may be delay=max(claimed tasks−desired tasks+1, 0)*n, where the "max" function returns the greater of the two arguments, and where n represents a proportional delay constant (e.g., 500 ms, 1 second, etc). Utilizing such an equation, the delay would be equal to zero until the number of claimed tasks equals the number of desired tasks. Thereafter, the delay would increase proportional to a selected n amount, which may be any specified delay amount.

Subsequent to implementing the determined delay, the routine 400 may continue at block 408, where the task may be claimed. As described above with respect to FIG. 2, claiming a task may correspond to transmitting a request to claim a task to a tasks data store. In some embodiments, claiming a task may include specifying a duration of the claim, such that other task processing devices 100 may attempt to claim the task at the expiration of the claim duration. In additional embodiments, if a task is claimed reluctantly (e.g., is in excess of the desired number of tasks), claiming a task may further include an indication that the task has been claimed reluctantly, such that other task processing devices 100 may request a release of the claim prior to expiration of a stored claim duration.

At block 409, the task processing device 100 may process the claimed task. In some embodiments, the task processing device 100 may be configured to continue the routine 400 while processing the task. Illustratively, the task processing device 100 may continue to claim additional or alternative tasks while processing one or more claimed tasks. As such, though block 409 is included in the routine 400 for clarity, the task processing device 100 may not be limited to processing claimed tasks within the routine 400. Rather, in some embodiments, processing of claimed tasks may be accomplished by alternative or additional routines.

At block 410, a determination may be made as to whether to claim additional tasks. In some embodiments, a task processing device 100 may be configured to claim a maximum number of tasks, which may be distinct from the specified desired number of tasks. In such embodiments, if the maximum number of claimed tasks has been reached, the routine 400 may end at block 412. Otherwise, the routine may continue at block 402, where an additional unclaimed task may be determined. In other embodiments, a task processing device 100 may be configured to claim additional tasks until no additional tasks remain. As such, the determination of whether to claim additional tasks may comport to a determination of whether any tasks remain unclaimed. If so, the routine 400 may continue at block 402 as described above. Otherwise, the routine 400 may end at block 412.

In still more embodiments, a task processing device 100 may be configured to continue routine 400 until no additional tasks remain incomplete. For example, while no unclaimed tasks may exist, a number of tasks may exist which are incomplete, but currently claimed. As such, a task processing device 100 may return to block 402 at the time when at least one task becomes unclaimed. For example, a task processing device 100 may inspect the claim duration of each claimed task, and return to block 402 at the time when the next task would become unclaimed. Such an embodiment may be utilized, for example, when a number of tasks are held reluctantly by additional task processing devices 100. Because a task is held reluctantly, a delay may be imposed before the task is reclaimed by the previously claiming task processing device 100. As such, an additional task processing device 100 may claim the task during the period of delay. In these embodiments, the routine 400 may continue such that each task processing device attempts to claim tasks during period of delay. Subsequent to all tasks being completed, the routine 400 may end at block 412.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for processing tasks, the method comprising:
   receiving, at a computing device, information corresponding to a set of tasks available for processing, wherein the computing device is associated with a desired number of claimed tasks;
   determining, by the computing device, at least one task of the set of tasks that is unclaimed by another computing device;
   determining a delay to be imposed prior to claiming the at least one task, wherein the delay is determined based at least in part on the number of tasks currently claimed by the computing device;
   determining that a period of time corresponding to the delay has elapsed;
   subsequent to the period of time, claiming the task by the computing device, wherein claiming a task prevents other computing devices from processing the task;
   retrieving data associated with the task from a data store;
   processing the retrieved data in accordance with the task; and
   storing the processed data.

2. The computer-implemented method of claim 1, wherein if the number of tasks currently claimed by the computing device is less than the desired number of claimed tasks, the duration of the delay is zero.

3. The computer-implemented method of claim 1, wherein the duration of the delay is proportional to the number of currently claimed tasks of the computing device which exceed the desired number of claimed tasks.

4. The computer-implemented method of claim 1 further comprising modifying a tasks data store to reflect a duration of the claim to the task.

5. A system for processing a number of tasks, the system comprising:
   a data store containing information corresponding to a set of tasks to be processed; and at least one computing device associated with a desired number of claimed tasks and in communication with the data store, the at least one computing device configured to:

for at least one task of the set of tasks:
determine a delay to be imposed prior to claiming the at least one task, wherein the delay is determined at least in part on the number of tasks currently claimed by the at least one computing device;
determine that a period of time corresponding to the delay has elapsed;
subsequent to the period of time, claim the at least one task,
wherein claiming the at least one task prevents other computing devices from processing the at least one task; and
process the at least one task.

6. The system of claim 5, wherein if the number of tasks currently claimed by the at least one computing device is less than the desired number of claimed tasks, the duration of the delay is zero.

7. The system of claim 5, wherein the duration of the delay is proportional to the number of currently claimed tasks of the computing device which exceed the desired number of claimed tasks.

8. The system of claim 5, wherein the duration of the delay based at least in part on the number of tasks within the set of tasks.

9. The system of claim 5, wherein the duration of the delay based at least in part on a desired fault tolerance of the at least one computing device.

10. The system of claim 5, wherein the at least one computing device is further configured to modify the data store to reflect a duration of the claim to the task.

11. The system of claim 5, wherein the at least one computing device is further configured to modify the data store to reflect completion of the task.

12. The system of claim 5, wherein the at least one computing device is further configured to:
receive a request to release claim to the task; and
in response to the received request, release claim to the task.

13. A computer-readable, non-transitory storage medium having computer-executable instructions for processing tasks, the computer-executable instructions comprising instructions that upon execution by one or more computing devices cause the one or more computing devices to:
receive information corresponding to a set of tasks;
determine at least one unclaimed task within the set of tasks;
determine a delay to be imposed prior to claiming the at least one unclaimed task, wherein the delay is determined based at least in part on the number of tasks currently claimed by the one or more computing devices;
determine that a period of time corresponding to the delay has elapsed;
subsequent to the period of time, claim the at least one unclaimed task; and
process the task.

14. The computer-readable, non-transitory storage medium of claim 13, wherein the computer-readable, non-transitory medium further comprises instructions that cause the one or more computing devices to be associated with a desired number of claimed tasks.

15. The computer-readable, non-transitory storage medium of claim 14, wherein if the number of tasks currently claimed by the one or more computing devices is less than the desired number of claimed tasks, the duration of the delay is zero.

16. The computer-readable, non-transitory storage medium of claim 14, wherein the duration of the delay is proportional to the number of currently claimed tasks of the one or more computing devices which exceed the desired number of claimed tasks.

17. The computer-readable, non-transitory storage medium of claim 13, wherein the computer-readable, non-transitory medium further comprises instructions that cause the one or more computing devices to modify the desired number of claimed tasks based at least in part on the number of currently claimed tasks.

18. A computer-implemented method for processing a number of tasks, the method comprising:
receiving, at a computing device, information corresponding to a set of tasks;
determining a delay to be imposed prior to claiming the at least one unclaimed task, wherein the delay is determined at least in part on the number of tasks currently claimed by the computing device;
determining that a period of time corresponding to the delay has elapsed;
subsequent to the period of time, claiming the at least one unclaimed task at the computing device; and
processing the task at the computing device.

19. The computer-implemented method of claim 18, wherein if the number of tasks currently claimed by the one or more computing devices is less than a desired number of claimed tasks, the duration of the delay is zero.

20. The computer-implemented method of claim 18, wherein the computing device is associated with a desired number of claimed tasks.

21. The computer-implemented method of claim 20, wherein the duration of the delay is proportional to the number of currently claimed tasks of the computing device which exceed the desired number of claimed tasks.

22. The computer-implemented method of claim 20 further comprising modifying the desired number of claimed tasks based at least in part on the number of currently claimed tasks of the computing device.

23. The computer-implemented method of claim 18 further comprising receiving a request to release claim to the task; and in response to the received request, releasing claim to the task.

* * * * *